United States Patent [19]
Wetzel et al.

[11] Patent Number: 5,912,795
[45] Date of Patent: Jun. 15, 1999

[54] CIRCUIT RESET LOCKOUT

[75] Inventors: Uwe Wetzel, Stockholm; Nils Svensson, Vagnhärad, both of Sweden

[73] Assignee: Ross Operating Valve Company, Troy, Mich.

[21] Appl. No.: 08/758,719

[22] Filed: Dec. 3, 1996

[30] Foreign Application Priority Data

Feb. 23, 1996 [SE] Sweden ................................. 9600697

[51] Int. Cl.⁶ ................................................. H01H 47/02
[52] U.S. Cl. .......................................... 361/170; 361/189
[58] Field of Search ................................... 361/160, 170, 361/179, 189; 307/326, 328; 192/129 A, 131 R

[56] References Cited

U.S. PATENT DOCUMENTS

| | | | |
|---|---|---|---|
| 3,579,049 | 5/1971 | Kitka .................................... | 361/189 |
| 3,662,227 | 5/1972 | Morrison et al. .................... | 361/189 |
| 3,813,021 | 5/1974 | Kramer . | |
| 3,895,269 | 7/1975 | Geremia ............................... | 307/112 |
| 3,933,065 | 1/1976 | Janu et al. . | |
| 4,054,935 | 10/1977 | Ginsberg .............................. | 361/189 |
| 4,138,005 | 2/1979 | Schneider et al. . | |
| 4,257,455 | 3/1981 | Cameron . | |
| 4,291,613 | 9/1981 | Porter . | |
| 4,354,270 | 10/1982 | Nuding . | |
| 4,412,268 | 10/1983 | Dassow ................................ | 361/189 |
| 4,542,767 | 9/1985 | Thornton et al. . | |
| 4,706,548 | 11/1987 | Baldauf et al. . | |
| 5,168,173 | 12/1992 | Windsor . | |
| 5,235,217 | 8/1993 | Kirton . | |

FOREIGN PATENT DOCUMENTS

| | | |
|---|---|---|
| 0 497 450 A1 | 8/1992 | European Pat. Off. . |
| 0 558 976 B1 | 7/1995 | European Pat. Off. . |
| 2 002 890 | 7/1971 | Germany . |
| 17 56 240 | 6/1979 | Germany . |
| 29 03 702 | 10/1979 | Germany . |
| 28 39 341 | 3/1980 | Germany . |
| 30 28 196 A1 | 2/1982 | Germany . |
| 32 30 056 A1 | 2/1984 | Germany . |
| 35 29 802 A1 | 2/1987 | Germany . |
| 42 21 756 A1 | 1/1994 | Germany . |

OTHER PUBLICATIONS

Resk 2563.IE 04/90 "Serpar® Crossflow Double Valves with Pressure Switches", Ross Europa GmbH, 1 page, no date provided by applicants.
Ross Product Catalog, p.G7, Nov. 1995.

*Primary Examiner*—Fritz Fleming
*Attorney, Agent, or Firm*—Harness, Dickey & Pierce, P.L.C.

[57] ABSTRACT

A reset lockout for a control device which functions to control and monitor the essentially simultaneous energization of two electromagnets (61, 62) in response to a respective electric signal (S1, S2) applied to said electromagnets essentially simultaneously, wherein each electromagnet includes an element (71, 72) which in a non-energized state of the electromagnet takes a first inactive, normal position and which upon activation of the electromagnet is displaceable to a second active terminal position, wherein the control device is constructed to ensure that the displaceable elements (71, 72) of both electromagnets (61, 62) will be moved to their respective active end positions essentially simultaneously and then remain in said end positions provided that both signals (S1, S2) are applied essentially simultaneously and then both maintained. Sensor means are provided for ascertaining in each working cycle of the control device that both controls signals have been applied and that the displaceable elements of both electromagnets have been moved to their respective active end positions. The reset lockout is constructed to break the supply of current to the control device when this provision is not met.

8 Claims, 1 Drawing Sheet

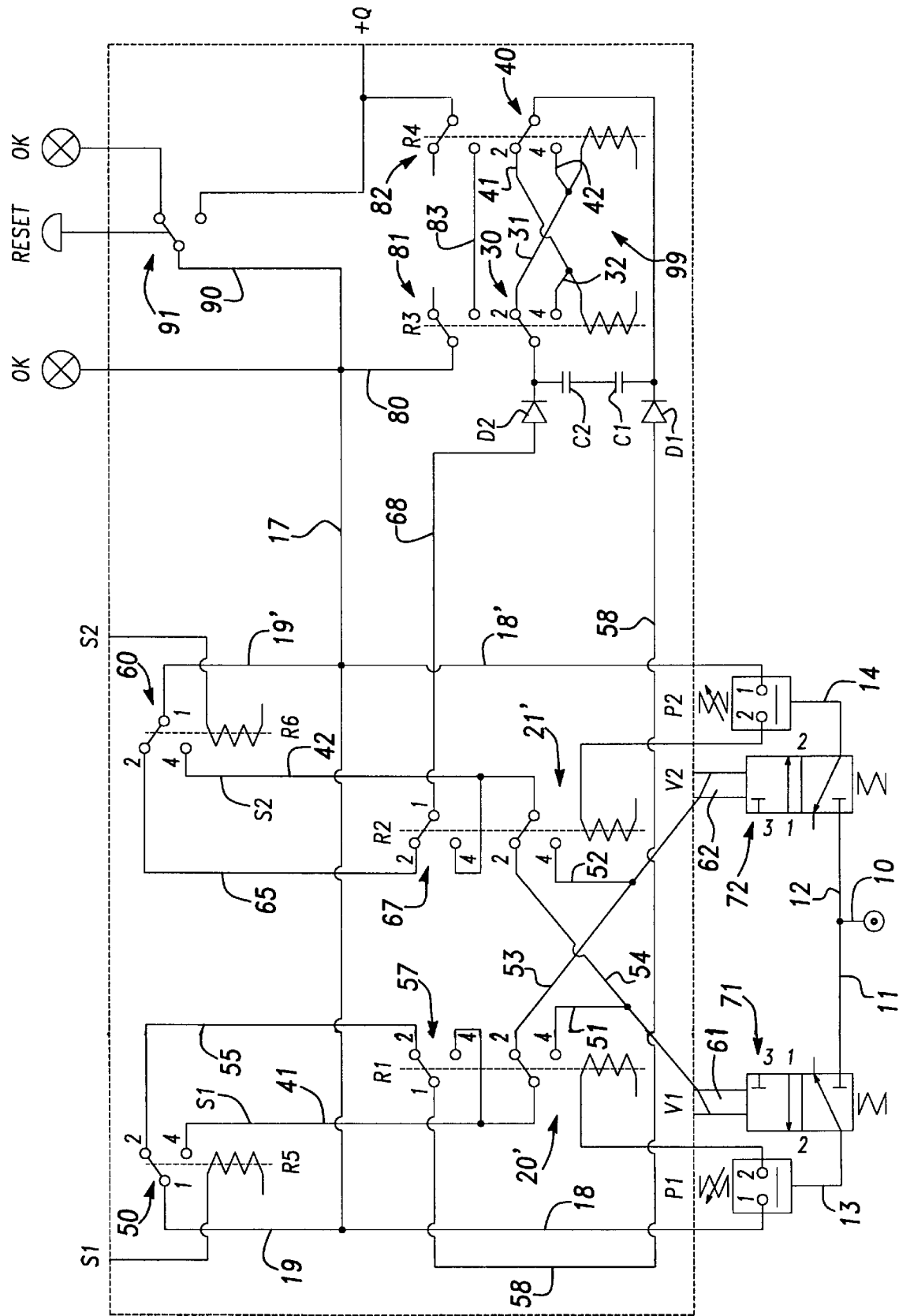

CIRCUIT RESET LOCKOUT

The present invention relates to a lockout which is operative in preventing the resetting of a control device which functions to control and monitor the essentially instantaneous activation of two electromagnets in response to respective simultaneously received electric signals, wherein each of the electromagnets includes an element which in the non-activated state of its associated electromagnet takes a first inactive normal position and which upon activation of said electromagnet is moved to a second active end position, wherein the control device is designed to ensure that the displaceable elements of said electromagnets will be moved to their active end positions essentially simultaneously and remain in said active end position provided that both signals are applied essentially at one and the same time and remain applied.

A control device of this kind finds use for instance in a so-called twin valve of the kind used to control the compressed air supply to a clutch or brake of a machine tool, such as an eccentric press. The control device may be connected, for instance, to a two-handed device which functions to control the supply of compressed air. In this case, it is necessary for the operator to actuate two separate control signal applying contacts essentially simultaneously. The aforesaid two elements may then be comprised of or connected to valve units which allow compressed air to be delivered to the eccentric press when activated. The twin valve will normally also include evacuation valves which are controlled by the two valve units. In order to close the evacuation valves and therewith allow compressed air to pass to the working cylinders of the press through the valve arrangement, it is necessary that the two valve units open rapidly and essentially simultaneously.

However, it will be understood by the person skilled in this art that the inventive control device can be used with other types of magnetically maneuvered elements.

So that the control device to be more readily understood and features thereof made apparent, the device will be described in the following with reference to a so-called twin valve which controls the flow of pressurized fluid to a machine tool where there is a risk of injury to the person or persons in attendance, wherein the twin valve is controlled by two control signals which, e.g., can be established with the aid of two electric switches which must be actuated simultaneously with each hand of the operator in order to open the flow of compressed air to the machine tool.

Rules, legislation and regulations require the valve arrangement to be designed so that malfunctioning of a component in the valve arrangement will not cause further movement in the machine tool. The control system shall also ensure that a new machine working cycle (press cycle) cannot be initiated after a valve component has become defective. The time taken to stop the machine tool during a working cycle (working stroke) in the event of a valve malfunction shall not be of such duration as to place the machine operator at risk.

It is known that these requirements can be fulfilled by delivering pressurized fluid/compressed air to an eccentric press, for instance, through the medium of a so-called double valve. Such double valves are well known to the art. An example of earlier known double valves is found in the valve retailed by Ross Europa GmbH, D-6070 Langen, Germany, under the designation Serpar® cross flow double valve.

Such known double valves/twin valves include two valve units which are normally closed and each of which is moved to an open position by a respective electromagnet in response to control signals applied to said magnets. The valve units are constructed and arranged to lie in series, for instance with respect to the compressed air supply to the consumer. The twin valve also normally includes two evacuation valves which are normally open and which are closed by the valve units as said valve units open. The evacuation valves may be connected in parallel to a drain or exhaust means. It is therefore necessary for the valve units to be opened simultaneously, in order to prevent the compressed air supplied from being evacuated to the drain. Simultaneous opening and closing of the two valve units is monitored by sensing the air pressures in respective valve units when their associated valve elements have begun to open and close respectively. This enables the two air pressures to be mutually compared, wherewith the valve arrangement enables compressed air to pass through the valve units when the sensed pressures are essentially equal to one another and are applied simultaneously. It is known to use for this monitoring process a single cylinder which is divided by a piston into two chambers to which pressure is delivered from an associated valve element. Movement of the piston will result in the electric signal to at least one electromagnet being interrupted, therewith preventing compressed air from being delivered to the machine tool. Another known monitoring system includes two cylinders which are each spring-biassed towards one end position and which are coupled to the pressure in respective valve units such that the position of the piston will give an indication of the pressure in the valve unit, i.e. that the valve unit has begun to open. An electronic monitoring device/logic is adapted to ensure that the electromagnets are prevented from holding the valve units open when the time difference between the pressurization of the valve units exceeds a predetermined value, with the guidance of the two sensed, pressure-controlled piston movements to this end.

Also known to the art is a similar arrangement which includes electric pressure-controlled switches that are switched from one state to another when the pressure in respective valve units corresponds to the supply pressure, said switches controlling the external electromagnetic monitoring arrangement. Such an external electronic monitoring arrangement is expensive and requires signal processing facilities, and is also able to introduce further fault sources that cannot easily be overcome.

The object of the present invention is to provide a control device reset lockout for a control device of the aforesaid kind. This object is achieved with the lockout circuit as described in the specification.

A reset lockout is able to prevent the control device operator from restarting the control device immediately after a malfunction has occurred. Immediately after a fault has occurred/has been detected, the reset lockout is triggered so as to prevent an immediate restart of the control device by applying the control signals. It is thus necessary for the operator to first reset the lockout. The operator is recommended to then ascertain why the lockout has been triggered and to rectify the cause prior to resetting the reset lockout to a state which will enable the control device to be activated. A repair technician is summoned when the machine operator is unable to locate and rectify the fault himself/herself.

The lockout can also function to detect faults of an accumulating and "self-healing" kind, for instance slow return of control signal switches and valves to their starting positions.

The lockout components that sense the control signals and movement of the magnets must be active so as to be activated each time the monitored component is activated.

Further embodiments of the invention are set forth in the specification.

The inventive reset lockout is particularly advantageous for use with the special type of control device set forth and described below with reference to an exemplifying embodiment.

The invention will now be described in more detail with reference to an exemplifying embodiment thereof and also with reference to the accompanying drawing.

FIG. 1 is a schematic circuit diagram of an inventive reset lockout as applied in a control device mounted in a schematically simplified double valve for controlling, for instance, a pneumatically controlled clutch and brake of a mechanical eccentric press.

Shown in the drawing is a compressed air line 10 through which compressed air is delivered to a machine tool, such as an eccentric press, via line branches 11 and 12 and valves 71, 72. The valves 71, 72 are normally closed, but can be moved against the action of a spring or the like to allow fluid to flow to the outlets 2 of the valves 71, 72. The fluid is passed from the two outlets to a valve arrangement (not shown) which ensures that the consumer will be supplied with compressed air only when the two valves 71, 72 are opened essentially simultaneously. One such valve arrangement, also called a twin valve, is sold by Ross Europa GmbH, D-6070 Langen, Germany, and is described in their leaflet RESK 256.1E 04/90, relating to "Serpar® cross flow double valve with pressure switches".

The valves 71, 72 can be moved to their respective open positions by a respective electromagnet or solenoid 61 (V1) and 62 (V2).

The pressure on the fluid outlet 2 of the valve 71 is sensed by a fluid pressure control contact (pressure monitor) P1 via a line 13, said contact normally being open. Current is supplied to the monitor P1 from a source Q via a reset lockout 90 and the lines or conductors 17, 18. The monitor P1 is connected to a relay R1. When the pressure in the line 13 overcomes the monitor release (burst) force, the relay R1 will open provided that current flows through the line 17. Current is also supplied from the line 17 to the line 19 and from there to a switch 50 controlled by a relay R5. The relay R5 is activated by a control signal S1. The switch 50 has two outputs 2, 4. When signal S1 is applied, the relay R5 is opened and current passes from the line 19 to the line 41, and from there via a switch 20' to its one output 4 (when the relay R1 is open) and via a line 51 to the magnet 61 so that the valve V1 opens and its pressure monitor P1, which senses the fluid pressure on the output of the valve V1 via a line 13, closes. The normally open pressure monitor P2 is supplied with current from the line 17 via the line 18' and energizes a relay R2 when the pressure in the control line 14 (on the output of valve V2) causes closure. The relay R2 controls two switches 21' and 67. A control signal S2 is applied to a relay R6 which controls a switch 60. When the relay R6 is activated, the control signal S2 is applied via the switch 60 to a line 42 connected to the switch 21'. When the relay R2 is activated, the signal S2 is applied to the magnet 62, via a line 52. When the magnet 62 has opened the valve 72, pressure from the line 10 can normally be sensed through the line 14 for closing the monitor P2. A line 52 connects the output terminal 2 of the switch 20' to the output terminal 4 of the switch 21'. A line 51 connects the output terminal 2 of the switch 21' to the output terminal 4 of the switch 20'. When the switches 20', 21' are switched substantially at one and the same time, the pressure monitor/valve is unable to leave its active position (due to its inertia) under the influence of its return means (springs or the like) before current is again applied to the magnets 61, 62.

The relay R1 also includes a switch 57 whose one input terminal 2 is supplied with current from the line 17 via the line 19 and the switch 50 and line 55 when the relay R5 is not open. The other input terminal 4 of the switch 57 is supplied with current from the line 17, via the line 41. The output terminal 1 of the switch 57 supplies a line 58. The relay R2 includes a switch 67 whose output terminal 1 supplies current to a line 68 via the line 42, or via the line 65, when the relay 26 is not activated.

The line 68 supplies a switch 30 via a diode D2. A capacitor C2 is connected downstream of the diode D2. Correspondingly, the line 58 supplies a diode D1. A capacitor C1 is connected downstream of the diode D1.

A relay R3 controls the switch 30 and also a switch 81. A relay R4 controls the switch 40 and also a switch 82. The state-alternating switches 81, 82 are series-connected via a line 83 in a shunt line 80 such as to close the shunt line when both relays R3, R4 are closed (inactive) and therewith to break the line 80 before one of the relays R3, R4 falls. The switch 40 is designed to maintain the current supply to its relay R4 via the line 42. Correspondingly, the switch 30 is designed to self-maintain the supply of current to its relay R3 via the line 32 from the line 68. In addition to the shunt 80, the current supply line 17 also includes a shunt 90 which is parallel with the shunt 80 and which includes a normally open reset switch 91. When P1 and P2 are open and S1 and S2 are 0, current can be conducted from the current source Q to the lines 58 and 68 via the switch 91 when said switch is activated, wherewith the relays R3, R4 are opened so that current from Q can instead flow via the shunt 80 so that the switch 91 can be broken. The energy magazine C1, C2 is now charged. When R5 and R6 are open, the supply of current through the lines 58, 68 falls off, although C1, C2 are able to hold the relays R3, R4 open until P1, P2 close and open their relays R1, R2 so that the supply of current through the lines 68, 58 is again ensured via the lines 41, 42. It will be understood that the shunt 80 is broken when only one of S1, S2 is applied, or when only one of the valves V1, V2 is open. The shunt 80 then remains broken even should V1, V2 then both be brought to the same position or state, or if both S1 and S2 are activated to the same state.

Thus, the valves V1, V2 cannot now be activated by signals S1, S2. The operator must first ascertain the reason why the current supply through the shunt was broken and take the necessary remedial measures. The operator is then able to actuate the reset switch 91 so as to enable the reset lockout 99 to establish the supply of current through the shunt 80.

Fundamentally, the control device monitors the valve arrangement and prevents further valve functioning in the event of a fault and prevents a restart when only one of the two valve elements 71, 72 remains open or closed;

only one of the two switches/pressure monitors P1, P2 remains in one position;

only one of the control signals S1, S2 remains or is non-existent;

when the asynchronism of the control signals (or of the relays R5, R6) is greater than a set value;

when the asynchronism of the pressure monitors P1, P2 (or of the relays R5, R6) is greater than the asynchronism of the control signals; and when the asynchronism of the valve elements is greater than the asynchronism of the control signals.

In addition, when triggered, the reset lockout affords the advantage of preventing the control device from being restarted by applying signals S1, S2. Restarting of the control device is also prevented even when the fault is self-healing or has been rectified. Thus, the operator must first activate a reset button before the control device can be restarted, this reset button preferably being distanced from the normal working position of the operator, and also requires all faults to be rectified.

The inventive lockout is active provided that it actively senses during each working cycle the application of both control signals and that both valves have been moved, and particularly that working pressure has been established on the output of both valves. The lockout also provides a check that all control components involved between the control signal source and desired valve movement are reset and operate correctly in each working cycle. The lockout is also self-controlling by virtue of all valve controlling components lying in series so that correct functioning requires all components of the control device to function correctly in each cycle.

The current breaking and comparison part of the lockout 99, i.e. the relays R3 and R4 and their respective switches, can be considered to be passive, even though this lockout part checks that all components of the control device function correctly in each cycle.

The modus operandi of the reset lockout and control device will be evident to the person skilled in this art from the accompanying drawing.

The person skilled in this art will also realize that the illustrated embodiment can be modified. For instance, the relay R5 and its switch 50 (and also the relay R6 and its switch 60) can be replaced with directly controlled alternating contacts. Furthermore, the pressure monitor P1 and the switch 20' (and also the pressure monitor P2 and the switch 21') can be replaced with alternating contacts which are controlled either directly or indirectly by movement of the valve elements 71, 72. The lockout function provided by the lockout 99 may, of course, be achieved with other equivalent means.

We claim:

1. A control device, comprising:
    a first valve responsive to and energized by a first electrical signal, the first valve assuming an inactive, normal position in a non-energized state and being displaceable to an active, terminal position in an energized state;
    a second valve responsive to and energized by a second electrical signal, the second valve assuming an inactive, normal position in a non-energized state and being displaceable to an active, terminal position in an energized state;
    a circuit for generally concurrently activating and deactivating the first and second valves, the circuit requiring generally concurrent and maintained application of the first and second electrical signals prior to activating and deactivating the respective first and second valves, the circuit further requiring generally concurrent removal of the first and second electrical signals prior to deactivating the first and second valves;
    a first sensor for providing a first output signal upon activation of the first valve;
    a second sensor for providing a second output signal upon activation of the second valve; and
    a reset lockout circuit for determining whether both the first and second electrical signals have been applied and whether the valves have been displaced to their respective active positions, the reset lockout circuit deactivating the respective first and second valves if the valves are not displaced to their respective active end positions, the reset lockout circuit further comprising a pair of self-holding relays, each having a first switch, the respective first switches being connected in series when the self-holding relays assume a predetermined state, the self-holding relays being activated without application of the first and second electrical signals and also being activated without application of the first and second output signals,
    wherein at least one of the self-holding relays are deactivated when one of the first and second sensors does not provide the respective output signals within a predetermined interval of application of the respective first and second electrical signals and wherein at least one of the self-holding relays are deactivated when one of the first and second electrical signals is not applied within a predetermined interval of application of the other electrical signal.

2. The apparatus of claim 1, wherein the lockout circuit further comprises a timer circuit for maintaining activation of the self-holding relays during an interval from application of the first and second electrical signals to activation of the respective first and second valves.

3. The apparatus of claim 1 further comprising:
    a first operator switch having a normally off position and an on position, the first operator switch generating the first electrical signal when the first operator switch is in the on position;
    a second operator switch having a normally off position and an on position, the second operator switch generating the first electrical signal when the first operator switch is in the on position,
    wherein the lockout circuit monitors the first operator switch and operation of the first valve, and the lockout circuit monitors the second operator switch and operation of the second valve.

4. The apparatus of claim 1, wherein the circuit for activating the first and second valves further comprises:
    a first control switch which controls the position of the first valve, the first control switch including an input terminal which is energized in accordance with application of the first electrical signal, wherein upon application of the first electrical signal, the first control switch initially activates the second valve and thereafter maintains activation of the first valve;
    a second control switch which controls the position of the second valve, the second control switch including an input terminal which is energized in accordance with application of the second electrical signal, wherein upon application of the second electrical signal, the second control switch initially activates the first valve and thereafter maintains activation of the second valve;
    a first reset switch having a pair of input terminals and an output terminal, the output terminal being connected to a selected one of the input terminals in accordance with activation of the first valve, the output terminal providing a first input signal to the reset lockout circuit; and
    a second reset switch having a pair of input terminals and an output terminal, the output terminal being connected to a selected one of the input terminals in accordance with activation of the second valve, the output terminal providing a second input signal to the reset lockout circuit.

5. The apparatus of claim 1 further comprising a reset switch, the reset switch normally being in a first, inactive position, and when moved to an active position, the reset switch energizes for operation the circuit for operating the first and second valves and the lockout circuit.

6. A lockout system for determining whether a pair of valves activate generally concurrently in response to generally concurrent application of a pair of control signals to each respective valve, comprising:

a first operator switch to generate a first of the pair of control signals;

a second operator switch to generate a second of the pair of control signals;

a first activation switch activated by the first control signal for activating one of the pair of valves, the first activation switch having a pair of electrical outputs, a first valve output for actuating one of the pair of valves and a first reset output;

a second activation switch activated by the second control signal for activating the other of the pair of valves, the second activation switch having a pair of electrical outputs, a second valve output for actuating the other of the pair of valves and a second reset output;

a lockout circuit for disabling power to the first and second operator switches and the first and second activation switches, the lockout circuit receiving the first and second reset outputs, the lockout circuit disabling power to the first and second operator switches and the first and second activation switches if either of the reset output signals is outside a predetermined range, wherein the reset lockout circuit further comprises a pair of switches, each including a power cutoff switch and a self-holding switch, wherein the power cutoff switch operates in a normal position when the respective self-holding switch is activated, and the power cutoff switch moves to a fault position when the respective self-holding switch is deactivated, thereby cutting off a supply of power to the first and second operator switches and the first and second activation switches.

7. The apparatus of claim 6 wherein the reset lockout circuit further comprises a timing circuit, the timing circuit compensating for temporary fluctuation of the output signals, wherein the timing circuit defines a predetermined interval during which the reset output signals may fall outside a range without deactivating at least one of the self-holding switches.

8. A timing circuit for determining whether a pair of valves activate generally concurrently in response to generally concurrent application of a pair of control signals to each respective valve, comprising:

a first operator switch to generate a first of the pair of control signals;

a second operator switch to generate a second of the pair of control signals;

a first activation switch activated by the first control signal for activating one of the pair of valves, the first activation switch having a pair of electrical outputs, a first valve output for actuating one of the pair of valves and a normally on first reset output;

a second activation switch activated by the second control signal for activating the other of the pair of valves, the second activation switch having a pair of electrical outputs, a second valve output for actuating one of the pair of valves and a normally on second reset output;

a lockout circuit for disabling power to the first and second operator switches and the first and second activation switches, the lockout circuit receiving the first and second reset outputs, the lockout circuit disabling power to the first and second operator switches and the first and second activation switches if either of the reset output signals changes to off, the reset lockout circuit further including a pair of switches, each including a power cutoff switch and a self-holding switch, wherein the power cutoff switches operate in a normal position when the respective self-holding switches are activated, and the power cutoff switch moves to a fault position when the respective self-holding switches are deactivated, thereby cutting off a supply of power to the first and second operator switches and the first and second activation switches;

a capacitive device interposed between signal lines conducting the respective reset output signals, the capacitive device being charged by the output signals when in the normally on state and discharged when the respective output signals change to off, the capacitive device maintaining the self-holding switches during discharge for a time interval in accordance with a capacitive value of the capacitive device, thereby providing a timer interval during which the lockout circuit continues to supply power.

* * * * *